United States Patent [19]
Borshchevsky et al.

[11] Patent Number: 5,568,542
[45] Date of Patent: Oct. 22, 1996

[54] BUILDING SHORT CIRCUIT REACT SYSTEM

[76] Inventors: Max Borshchevsky, 2321 63rd St., Brooklyn, N.Y. 11204; Mikhail Makaryan, 3808 Shore Pkwy. #2, Brooklyn, N.Y. 11235

[21] Appl. No.: 379,977

[22] Filed: Jan. 27, 1995

[51] Int. Cl.$^6$ ............... H04M 1/60; H04M 9/00; H04M 1/24; H04M 3/08
[52] U.S. Cl. ............... 379/171; 379/1; 379/34; 379/32
[58] Field of Search ............... 379/156, 159, 379/160, 167, 171, 177, 182, 34, 1, 27, 102, 103; 340/511.1, 825, 825.45

[56] References Cited

U.S. PATENT DOCUMENTS

| | | |
|---|---|---|
| 3,484,561 | 12/1969 | Matthews . |
| 3,728,493 | 4/1973 | Ter Veen . |
| 3,989,908 | 11/1976 | Budrys et al. . |
| 4,081,614 | 3/1978 | Danquist et al. ............... 379/159 X |
| 4,459,434 | 7/1984 | Benning et al. ............... 379/160 |
| 4,658,095 | 4/1987 | Santiago ............... 379/173 X |
| 4,884,034 | 11/1989 | Guzman . |
| 5,321,742 | 6/1994 | Stevens . |

FOREIGN PATENT DOCUMENTS

| | | |
|---|---|---|
| 61-236261 | 10/1986 | Japan . |
| 63-69362 | 3/1988 | Japan . |

*Primary Examiner*—Wellington Chin
*Assistant Examiner*—Paul L. Loomis
*Attorney, Agent, or Firm*—Richard C. Litman

[57] ABSTRACT

A self-correcting intercom system with circuitry to detect faults within the circuitry and phone lines and reset the system to a pre-fault condition on the occurrence of a fault. The intercom system has an alarm system with a line control unit and a timer to reset the intercom system to a standby condition. A set up control unit includes all of the codes and signals to reset the other components of the intercom system upon activation of the set up control by the timer or the line control unit. A timer activates the set up control unit when a user initiates a call from an entrance vestibule panel to an apartment unit and no connection has been made within a certain time period. A line control unit activates the set up control when a connection is made, but a line fault such as a short circuit occurs disrupts normal communication. The system consumes electrical power only when needed.

15 Claims, 4 Drawing Sheets

BUILDING SHORT CIRCUIT REACT SYSTEM

BACKGROUND OF THE INVENTION

1. Field of the Invention

The present invention relates to a building intercom system with a short circuit detection and correction system.

2. Description of the Prior Art

It has been an increasing concern by apartment builders to provide an apartment intercom/door release system that not only is secure, but also reliable. As apartment buildings with 200 apartments or more become commonplace, it is extremely burdensome and time consuming to trace every wire in an intercom system to locate a fault. In addition, the entire intercom system may be out of order until the fault is found.

Systems have been developed in the past to provide an intercom system with increased reliability and/or ease of use.

U.S. Pat. No. 3,484,561 issued to Matthews on Dec. 16, 1969 shows a general intercom system which uses a standard telephone in place of a wall unit in each tenant apartment. The system includes a call waiting tone to alert a tenant that a visitor is trying to reach the tenant over the intercom system.

U.S. Pat. No. 3,728,493 issued to Ter Veen on Apr. 17, 1973 shows an intercom system which has an entrance phone with a two way speaker, and uses a normal, "standby" condition to minimize the amount of energy required by the system.

U.S. Pat. No. 4,658,095 issued to Santiago on Apr. 14, 1987 shows a two wire intercom system with a standby mode to reduce energy requirements of the system. A timer is disclosed for shutting down the intercom system if a tenant does not answer within 20–30 seconds. Also, the intercom system is disclosed to continue to operate in the presence of a short circuit, but no further details are disclosed.

U.S. Pat. No. 5,321,742 issued to Stevens on Jun. 14, 1994 shows an intercom system which uses a touchtone telephone in each apartment, each telephone being connected to a door speakerphone. Activation of a keypad on the speakerphone sends a "paging" signal to a touchtone telephone of a selected apartment.

Several developments have also been made to help reduce the amount of time required to track down and locate short circuits in large scale electrical systems.

U.S. Pat. No. 3,989,908 issued to Budrys et al. on Nov. 2, 1976 shows a circuit diagram for a public address system which uses a line-end resistor to detect a change in impedance in the line caused by a short circuit.

U.S. Pat. No. 4,884,034 issued to Guzman on Nov. 28, 1989 shows a current probe used in an underground power distribution system. The probe is used to detect short circuits or faults in the underground distribution system.

Japanese Patent 61-236261 published on Oct. 21, 1986 shows a data monitoring system for a private exchange which records and compares data on the exchange bus immediately prior to the fault to help determine the cause of the fault.

Japanese Patent 63-69362 published on Mar. 29, 1988 shows a circuit for interrupting a call after a preset time period to protect the system during short circuiting of a related corridor light system.

None of the above inventions and patents, taken either singly or in combination, is seen to describe the instant invention as claimed.

SUMMARY OF THE INVENTION

The present invention relates to a self-correcting intercom system with circuitry to detect faults with in the circuitry and phone lines and to reset the system to a pre-fault condition on the occurrence of a fault. An alarm system has a line control unit and a timer to reset the intercom system to a standby condition. The timer will reset the system if a user initiates a call from an entrance vestibule panel to an apartment unit and no connection has been made within a certain time period. The line control unit will reset the intercom system if a connection is made, even though a line fault such as a short circuit has occurred, disrupting normal communication.

Accordingly, it is a principal object of the invention to provide an intercom system with a fault detection circuit.

It is another object of the invention to provide an intercom system with a timer to reset the intercom system after the intercom has failed to establish communication between the vestibule panel and the apartment stations on the system at the termination of a specified time period.

It is a further object of the invention to provide an intercom system with a fault protection circuit that will reset the system to a pre-fault condition on the occurrence of a short circuit, so that the rest of the system will continue to function.

Still another object of the invention is to provide an intercom system that utilizes a minimum amount of energy while providing full intercom services and fault protection circuitry.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

The present invention relates to an intercom system and a protection system therefor. The operation of the intercom system will be described with reference to the FIGS. shown in the figure provided.

Figure 1:
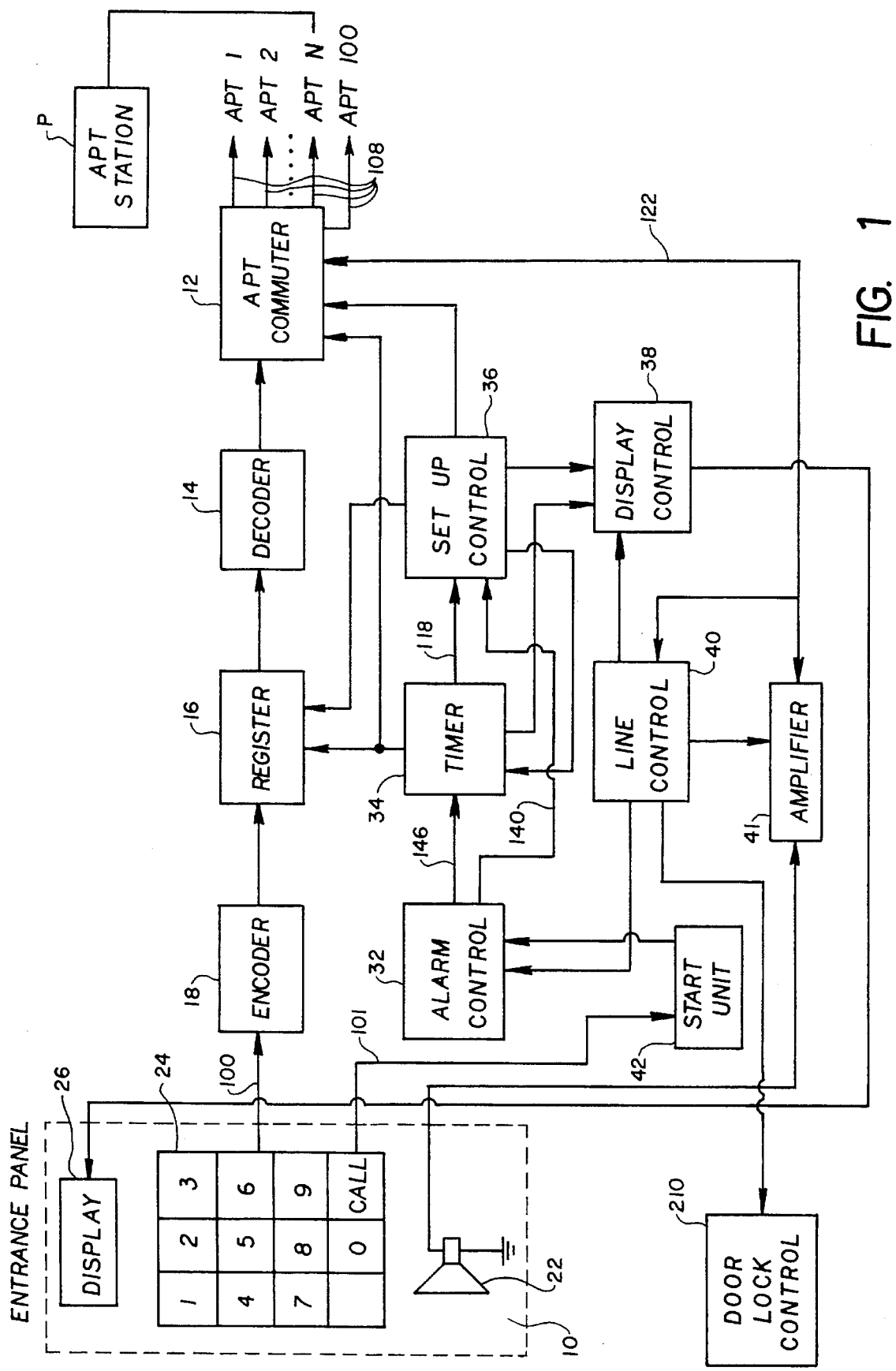
FIG. 1 is a block diagram of the intercom protection system according to the present invention, illustrating various elements of the system.

FIG. 1 shows an electronics circuit for an intercom system which alternatively links an entrance vestibule panel 10 with an array of apartment stations APT 1 through APT 100. Each apartment APT N has an apartment station P which is either a wall mounted intercom speaker unit or a standard telephone set or equivalent system. Between the vestibule panel and the apartment station is an intercom circuit which acts both to link the proper apartment station APT N with the entrance vestibule panel and to reset the intercom system when a fault such as a short circuit in an apartment station APT N occurs.

The entrance panel 10 is provided with a KEYPAD 24, a SPEAKER 22, and a DISPLAY 26. The SPEAKER 22 is shown as a two way speaker, but could also be any electronic sound conversion means including a separate speaker and microphone or a telephone handset, which can convert sound to electric signals and convert electric signals into sound. For electrical considerations, the component chosen for the SPEAKER should be selected with regard to the apartment station P in use. Preferably the SPEAKER is a telephone handset and the apartment station is telephone unit, or both are wall mounted intercom speaker units.

The vestibule panel of the present invention has been updated to use a standard 12 button keypad 24 rather than the fixed, multiple button devices of the prior art intercom vestibules (see FIG. 4, 410) having a separate button for each apartment. Rows and columns of buttons having a one-to-one correspondence with a particular apartment on the prior art vestibule panels were each labeled with the name or apartment number of the tenants, such that a visitor would select the appropriately labeled button to buzz or ring the apartment of the desired tenant. Supplier were required to stock a wide range of vestibule panel sizes in order to accommodate apartment buildings of greatly disparate apartment numbers.

To connect the entrance vestibule panel 10 with an apartment station P, according to the present invention, a user depresses numbers on the KEYPAD 24 which correspond to a particular apartment, and depresses the CALL button on the keypad to initiate the intercom system. The numbers which the user enters in to the system may be either the apartment number itself, or a published code number which has a one to one correspondence with a particular apartment. If the intercom has a "sleep" mode, where the intercom is normally dormant to reduce the power consumption of the intercom system, an initial code such as a "9" or an "*" may be required as a header code to alert the intercom system that a sequence of numbers is to follow.

An optional DISPLAY 26 provided on the intercom shows relevant information concerning the intercom transmission. The displayed information may relate to either the numbers depressed, instructions on how to use the intercom, or to the status of the intercom system, including "busy", "answering", "on line", or "out of order" messages. The DISPLAY 26 may also be used to display a listing of the tenants alphabetically or by apartment number with the corresponding intercom code to be entered into the keypad.

Activation of the CALL button causes signals to be transmitted through two different circuits on the intercom system. The first circuit designated by line 101 sends a signal to the START UNIT 42 which initiates the ALARM CONTROL unit 32. The ALARM CONTROL sends an initiate signal to the SET UP CONTROL unit 36 through line 140. The SET UP CONTROL unit 36, on receiving the signal from the ALARM CONTROL 32, sends a signal to a TIMER 34 to initiate a countdown. The TIMER sends an initiate signal to the REGISTER, DISPLAY CONTROL, and APARTMENT COMMUTER to initialize the components for signal processing.

The TIMER 34 begins the timed countdown which will continue until the countdown is completed and the TIMER sends a "time out" signal to the SET UP CONTROL, or until the TIMER receives a cancel countdown signal from the ALARM CONTROL. The length of the countdown is preferably in the 20 seconds to one minute range.

The second circuit receiving information from the entrance panel is designated 100. Each number or key depressed by the user, as described above, is converted into a tone or pulse by the entrance panel speaker or handset, as is well known in the telephone art. These signals are transmitted through the second circuit to an ENCODER 18. The ENCODER converts the tones or pulses into binary bits and transmits the bits to a REGISTER 16.

The REGISTER has a table of numbers in a programmable memory bank with a column containing "incoming code" numbers and a column containing "outgoing code" numbers. The REGISTER receives the incoming code which represents the numbers depressed on the keypad, and converts them to an outgoing number which represents a switching sequence which will be sent to the switch box, APARTMENT COMMUTER 12, to switch the switch box to connect with the desired apartment station P in apartment APT N. The outgoing bits from the REGISTER are converted into a pulse, tone, or electric signal by a DECODER 14 and transmitted to the APARTMENT COMMUTER 12.

The APARTMENT COMMUTER is a switching device which connects an incoming line 122, in communication with the entrance panel, with one particular apartment APT N. The APARTMENT COMMUTER then rings or otherwise activates the apartment station P to alert a resident that a user has dialed the resident's apartment.

During normal operation, if the resident in the apartment answers the call or takes the receiver off hook, before the TIMER 34 has expired, a LINE CONTROL unit 40 will detect the completion of the connection and will send a signal to the ALARM CONTROL 32 which sends a cancel countdown signal to the TIMER 34, shutting off the countdown. The LINE CONTROL 40 also sends a signal to an AMPLIFIER 41. The AMPLIFIER 41 turns on a two way speaker 22 or handset on the entrance panel and connects it with the apartment station P. Two way communication between the user and the resident is thus established. The resident can, upon verifying the identification of the caller, enter a code into his apartment station P to activate an electronic release of the apartment door latch (210). The use of an intercom system to release a door electronically upon entry of a code or tone is well known per se and needs no further explanation.

If however, the TIMER 34 reaches the conclusion of its countdown before the apartment station P in apartment APT N is answered, the TIMER 34 will send a signal through line 118 to the SET UP CONTROL unit 36. When the SET UP CONTROL unit 36 receives a signal through line 118, the unit sends a reset signal to the REGISTER 16, DISPLAY CONTROL 38, and APARTMENT COMMUTER 12. The DISPLAY CONTROL 38 sends an update signal to the DISPLAY 26 to display a "time out" message or similar information. The APARTMENT COMMUTER 12 disconnects the apartment station P in apartment APT N to prevent the apartment station from continuously ringing, and shuts down the intercom system in case a general failure prevented a proper connection. This standby mode also saves power usage since all of the components are inactive and draw less current.

Figure 2:
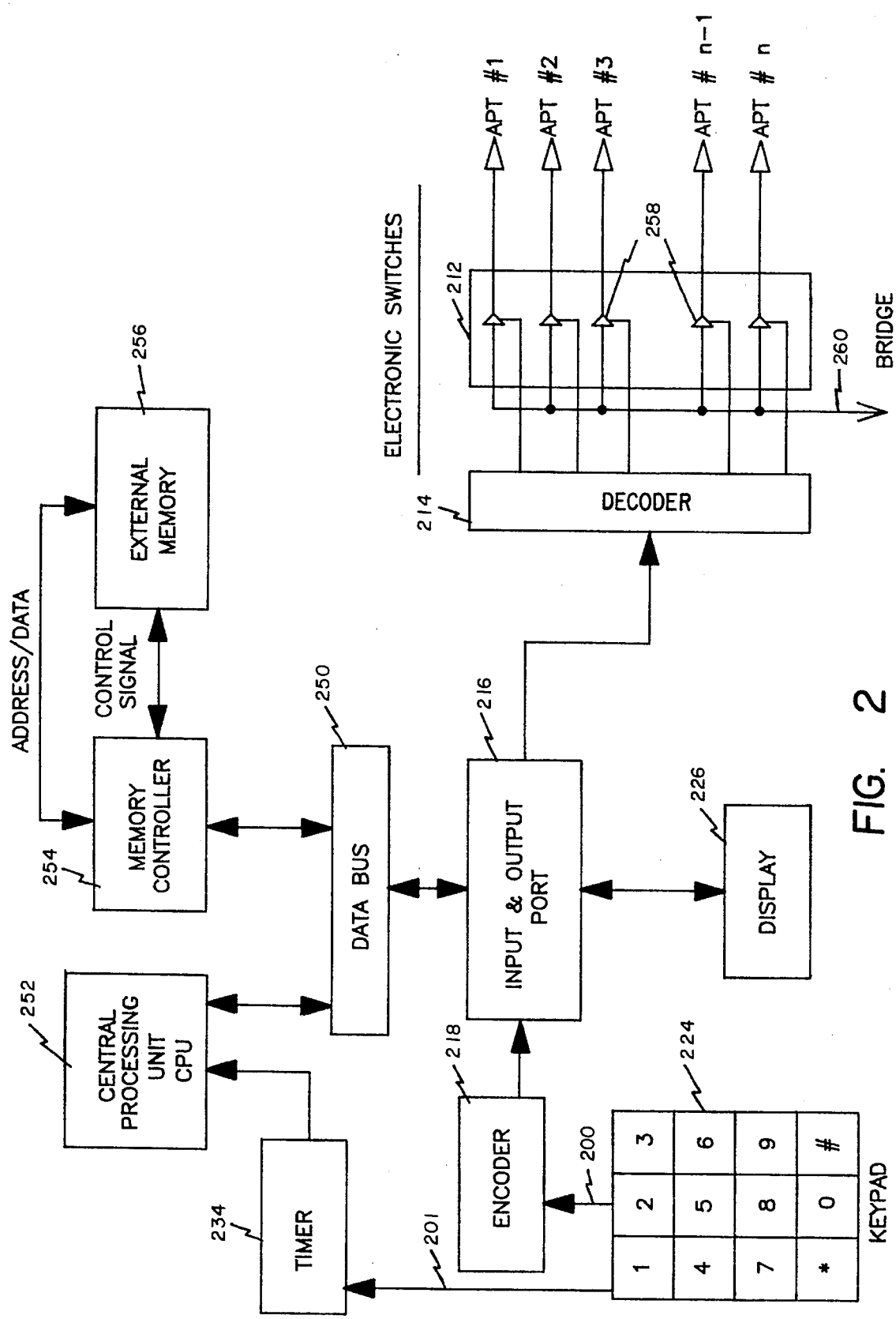
FIG. 2 is a block diagram of an intercom system according to a second embodiment of the invention showing the operation of a display enhanced vestibule panel and a control system for connecting the vestibule panel with an individual apartment.
Figure 3:
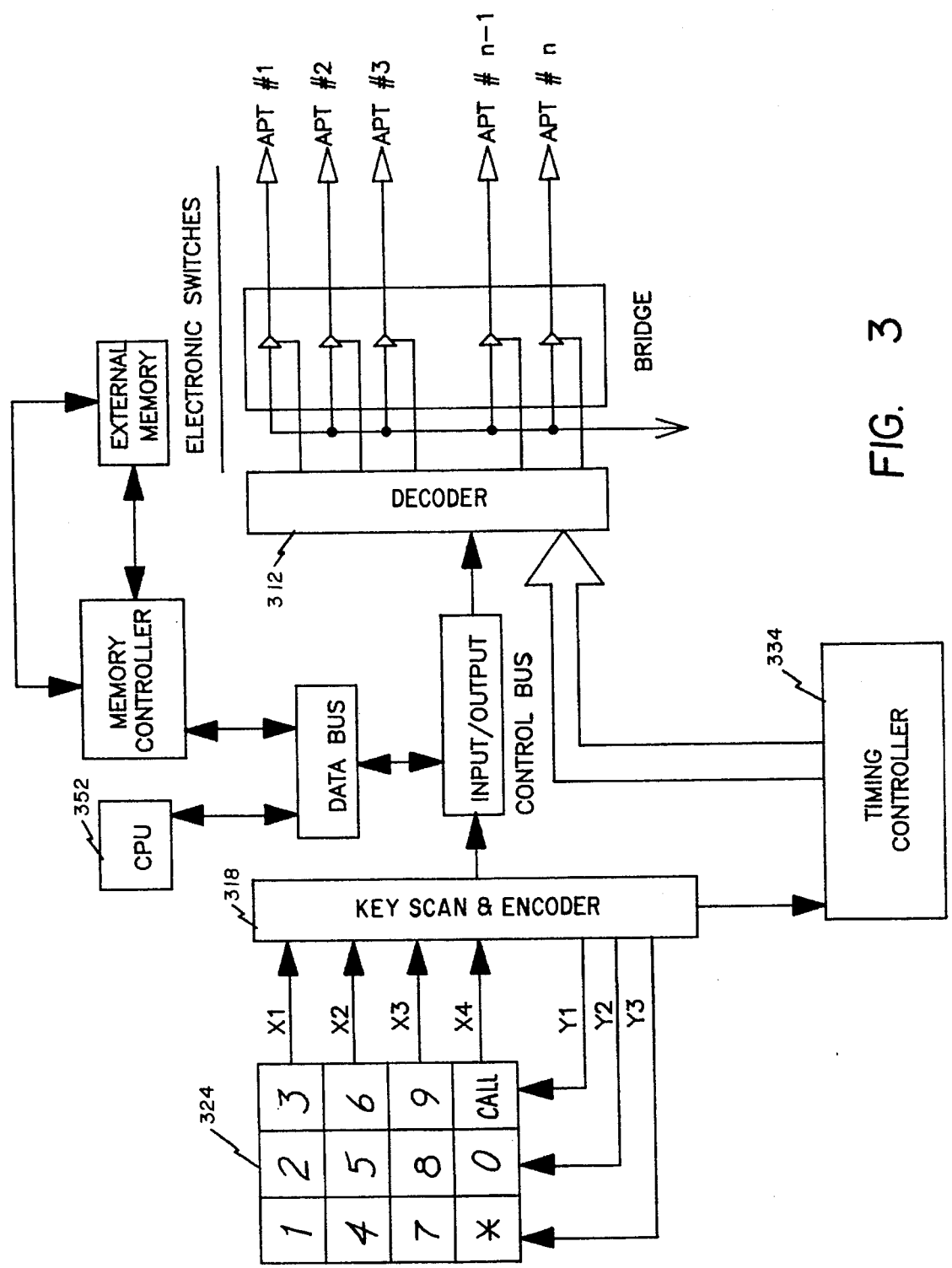
FIG. 3 is a block diagram showing a displayless vestibule panel, detailing the operation of the keypad, scanner, and encoder according to a third embodiment of the invention.

FIGS. 2 and 3 show alternate arrangements of the vestibule panel of FIG. 1 and a control system for connecting the vestibule panel to a specific apartment station. FIG. 2 shows an arrangement including a display associated with the vestibule panel, and FIG. 3 shows an arrangement without a display.

Analogous to FIG. 1, a KEYPAD 224 according to a second embodiment of the invention emits a tone to ENCODER 218 corresponding to the key number pressed on the KEYPAD. The ENCODER converts the tone into a bitstream representing the code (ie., key number) typed on the KEYPAD 224 as previously discussed. The ENCODER sends the converted signal to an INPUT/OUTPUT PORT 216. A DATA BUS 250 in communication with the INPUT/OUTPUT PORT sends the bitstream from the INPUT/OUTPUT PORT to a CENTRAL PROCESSING UNIT 252 and to a MEMORY CONTROLLER 254.

The MEMORY CONTROLLER 254 controls a programmable EXTERNAL MEMORY bank 256 containing a table of numbers to correlate keypad entered codes with apartment switching sequence codes. The "incoming code" number, the bitstream code, is converted by the CENTRAL PROCESSING UNIT (CPU) 252 to an "outgoing code" number, the apartment switching sequence bitstream code, according to the data contained in the table in the EXTERNAL MEMORY 256. The outgoing code is sent back through the DATA BUS 250 to the INPUT/OUTPUT PORT 216.

The CPU 252 also concurrently controls a DISPLAY 226 associated with the ENTRANCE PANEL 10 (see FIG. 1) to provide the user with relevant information as discussed above, related to the use or operation of the vestibule panel. The CENTRAL PROCESSING UNIT 252 retrieves information from the EXTERNAL MEMORY 256 related to either the keycode dialed into the KEYPAD 224 (and received by the CPU as a bitstream data through the DATA BUS 250) or related to the condition of the SWITCH BOX 212 such as "BUSY" or "ANSWERING."

The output code from the INPUT/OUTPUT PORT 216 is sent to the DECODER 214 and converted to an electronic switching code to activate the bank of electronic switches in the APARTMENT COMMUTER 212. The signal causes one individual switch 258 to switch to "ON" and the remaining switches to remain "OFF." The activated switch 258 connects an apartment, here shown as apartment #2, to a telephone BRIDGE 260 which is connected to a speaker or handset at the vestibule panel (see 22 in FIG. 1), allowing an alert signal to the APARTMENT STATION P and allows communication between the visitor at the vestibule panel and the apartment tenant.

A TIMER 234 analogous to timer 34 is connected to the KEYPAD 224 by line 201. The TIMER is initiated by activation of the KEYPAD 24 and sends a signal to the CPU when a preset time period has elapsed. The CPU then causes a shutdown signal to be sent to the switching unit to disconnect the apartment and the vestibule panel. The CPU then send a "TIME OUT" message to the display to inform the user of the disconnect.

FIG. 3 shows a circuit according to a third embodiment of the invention analogous to the circuit of FIG. 2. The circuit of the third embodiment does not use a display unit, and shows in greater detail the operation of the keyboard and encoder.

In the embodiment of the KEYPAD shown in FIG. 3, paths X1–X4 and Y1–Y3 are connected to the rows and columns of the KEYPAD to send a unique signal to the scanner for each key pressed. When an alert signal such as a "9" or a "*" are sent to the KEY SCAN AND ENCODER 318, the scanner is turned on and waits for a certain number of keystrokes on the KEYPAD. The user then enters a limited sequence of numbers on the KEYPAD representing the proper code to reach an APARTMENT STATION P.

The SCANNER 318 receives the signal as an array of data from the KEYPAD denoting the row X and column Y of a key on the KEYPAD which has been depressed. For example, depressing key 8 will send a signal through X3 and through Y2 to the scanner. The signal is then converted to a unique bitstream data sequence by the encoder denoting the key pressed, or sequence of keys for use by the CPU 352 for processing as discussed above.

Depression of the CALL button also activates the TIMING CONTROLLER 334 to shut down the intercom system if the dialing sequence is not completed or connection is not made to an APARTMENT station within a preset time limit. The TIMING CONTROLLER 334 compares the time elapsed since the CALL button was depressed with a time limit stored in programmable database within the TIMING CONTROLLER. When the time elapsed reaches or surpasses this number, the TIMING CONTROLLER sends a disconnect signal to the DECODER to deactivate any connection made by the SWITCH BOX 312. Because a display is not connected to the intercom system, it is not necessary to send a separate disconnect system to the CPU 352. The CPU unit is only activated during the conversion of the encoded signal to the proper electronic switching sequence for the SWITCH BOX 312.

Returning to FIG. 1, an additional safety feature is also provided to protect against a short circuit in the system. If the resident answers the apartment station P before the TIMER elapses, and has a short circuit in the apartment station P or in phone lines 108 which prevent proper operation of the apartment station, the TIMER will not shut down the system, because the TIMER will have been cancelled when the LINE CONTROL 40 detected that the apartment station had answered, leaving the system open. With out the additional protection circuitry provided by the present invention, the short circuit could then disrupt the entire intercom system either by leaving the line open and non-disconnectable, or by tripping an electric breaker (not shown) which could disable the whole system.

According to the invention, however, the LINE CONTROL 40 will detect a short circuit in the system and send a "fault detect" signal to the ALARM CONTROL 32. The ALARM CONTROL 32 will then send a "shut down" signal to TIMER through line 146 and to the SET UP CONTROL 36 through line 118. The SET UP CONTROL will then proceed to send reset signals to the REGISTER, APARTMENT COMMUTER, and DISPLAY CONTROL, the same as if the TIMER had expired. By resetting the system in this manner, the intercom system can continue to be used to connect to any apartment except for the apartment experiencing the short circuit. The resident with the shorted apartment station P or line 108 would then have to report the fault to the supervisor, but only the intercom lines to the one apartment would have to be traced to find the fault.

Alternatively, an alarm light (not shown) could be used to warn the intercom system supervisor of a fault, or an alarm light could be placed in each apartment to notify the resident of a fault in his line. In the latter instance, the resident could then contact the supervisor and alert him or her as to the fault.

During normal operation of the intercom system, the LINE CONTROL unit 40 also serves another function. If the resident answers the call from the visitor, and connection has been established, and there is no short circuit in the apartment station, then the LINE CONTROL unit 40 is used to terminate the connection at the end of the call. The LINE CONTROL 40 will detect when the resident breaks the connection. The LINE CONTROL 40 will then send a reset signal to the ALARM CONTROL 32 which will send a reset signal to the SET UP CONTROL 36 through the TIMER 34. The SET UP CONTROL will then reset the REGISTER 16, APARTMENT COMMUTER 12, and DISPLAY CONTROL 38 as discussed above. The visiting user is then free to dial another apartment or the same apartment, if necessary.

One skilled in the art would recognize that while the invention has been described for use with the keypad operated vestibule panel, the invention could also be used with prior art type vestibule panels having one vestibule panel button correlating to each apartment. These prior art vestibule panels contained multiple, normally open buttons, which upon depression of a button created a direct connection to an apartment station speaker to "buzz" or "ring" the apartment. The apartment tenant could then press a talk or listen button on the apartment station to connect the vestibule panel speaker with the apartment station speaker to talk or listen to the visitor, holding the circuit open while the button was depressed.

Figure 4:
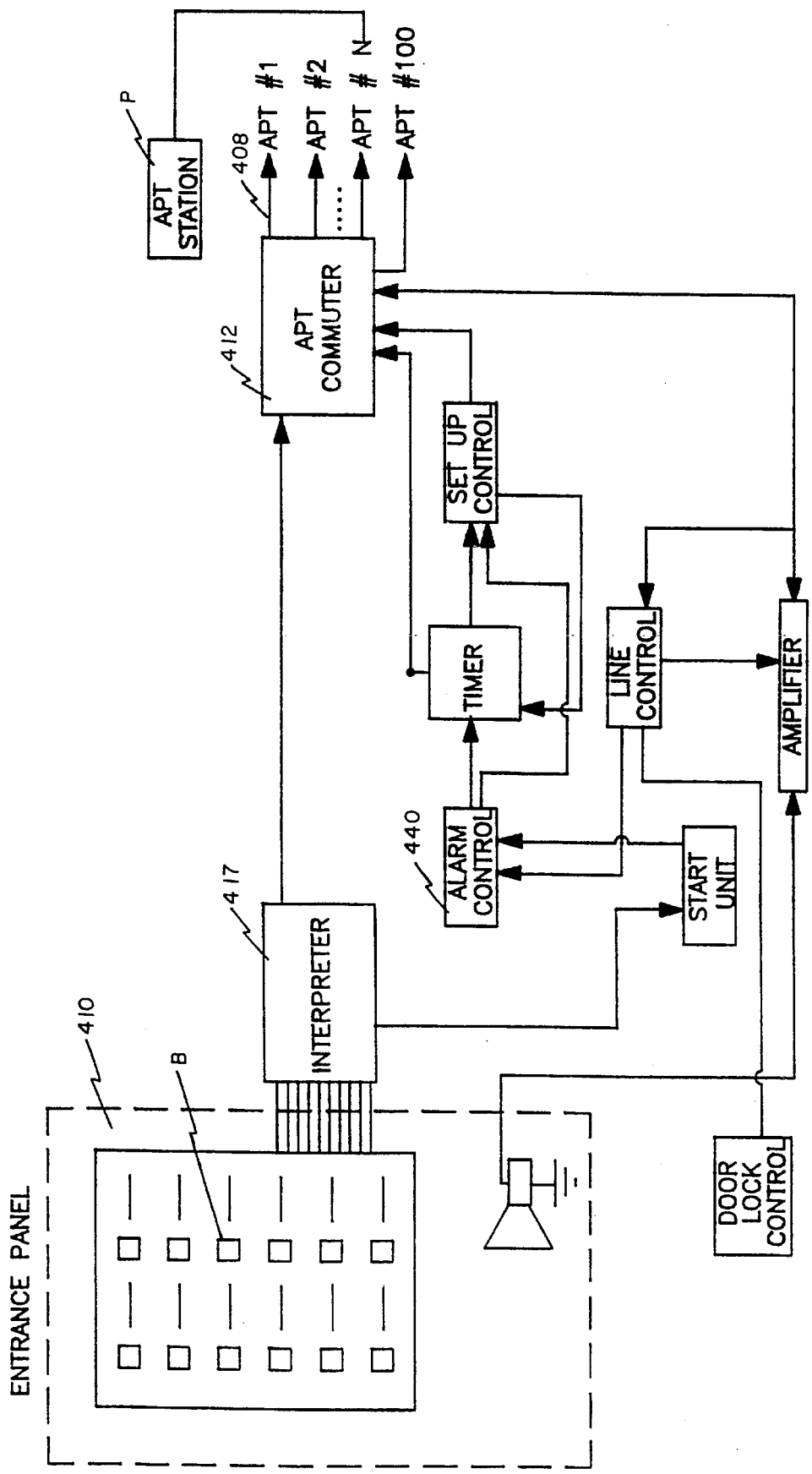
FIG. 4 is a block diagram of a fourth embodiment of the invention showing operation of the intercom system installed on an existing multiple button, vestibule panel.

FIG. 4 shows a circuit according to a fourth embodiment of the invention for use in upgrading an existing multiple button VESTIBULE PANEL 410. A circuit according to the present invention is installed between an existing VESTIBULE PANEL 410 and the individual apartment lines 408. An INTERPRETER 417 is installed between the VESTIBULE PANEL 410 and the SWITCH BOX 412 to detect which apartment button B has been pressed and to issue an appropriate switching sequence to the APARTMENT COMMUTER 412, analogous to the KEYSCANNER and ENCODER discussed previously. Because the connection between the VESTIBULE PANEL 410 and the APARTMENT STATION P is performed by an electronically controlled switching unit, the intercom circuit of the present invention can be used to shut down and reset the intercom circuit by analyzing the circuit and sending control signals to the switching unit in response to the circuit conditions. The short circuit detection system is provided in part by the LINE CONTROL unit 440, which detects short circuits in the system and resets the INTERPRETER 417 and APARTMENT COMMUTER 412 to protect the system from short circuits potentially disabling the system.

Accordingly, it is to be understood that the present invention is not limited to the sole embodiment described above, but encompasses any and all embodiments within the scope of the following claims.

We claim:

1. An intercom system comprising:
   an electrical circuit including an entrance vestibule panel, a switch box, a plurality of apartment station phones, and an alarm control circuit;
   said entrance vestibule panel including an electronic sound conversion means and a keypad;
   said keypad including a plurality of keys for selectivity emitting a tone corresponding to each one of said plurality of keys;
   said switch box including switching means for switching said switch position of said switch box responsive to said tone emitted from said keypad for connecting said entrance vestibule panel with one of said plurality of apartment stations;
   a line control unit for detecting said switch position of said switch box and sending a first line signal when said entrance vestibule panel is connected to said one of said plurality of apartment stations, and sending a second line signal when said entrance vestibule panel is unconnected to said one of said plurality of apartment stations; and
   an alarm control unit for detecting a short circuit in said electric circuit of said intercom system and for resetting said switch box in response to a reset signal.

2. The intercom system according to claim 1, further comprising a start unit responsive to said keypad for emitting a start signal when one of said keys of said keypad is depressed.

3. The intercom system according to claim 2, further comprising a display unit on said entrance vestibule panel, and a display control unit for changing said display in response to said line signal of said line control unit.

4. The intercom system according to claim 3, further comprising:
   an encoder for converting said tone to a digital stream of bits;
   a register including a programmable table of numbers for converting said digital stream of bits to a switching sequence of bits; and
   a decoder for converting said switching sequence of bits to a series of electrical pulses;
   whereby said tone emitted from said keypad is converted to a digital stream of bits, converted to a switching sequence, and converted to a series of pulses which are sent to said switch box to switch said switch position of said switch box to connect said electronic sound conversion means with said one of said plurality of apartment station phones.

5. The intercom system according to claim 4, further comprising a timer for emitting a reset signal after a predetermined time after initiation of said timer, wherein said timer is initiated by a start signal from said start unit.

6. The intercom system according to claim 5, further comprising a set up control unit for resetting said register, said switch box, said timer, and said display control in response to said reset signal.

7. The intercom system according to claim 4, wherein said alarm control is configured to reset said switch box by provision of means for emitting a reset signal to said set up control unit when a short circuit is detected by said alarm control unit.

8. The intercom system according to claim 6, further comprising a control that resets said switch box by emitting a reset signal to said set up control unit when a short circuit is detected by said alarm control unit.

9. The intercom system according to claim 1, further comprising an amplifier for connecting said electronic sound conversion means of said entrance vestibule panel to one of said plurality of apartment stations responsive to said line control unit.

10. The intercom system according to claim 1, wherein the electronic sound conversion means is a speaker.

11. The intercom system according to claim 1, wherein the electronic sound conversion means is a telephone handset.

12. An intercom system comprising:

an electrical circuit including an entrance vestibule panel, a switch box, a plurality of apartment stations, and an alarm control circuit;

said entrance vestibule panel including an electronic sound conversion means, a keypad, and a display unit;

said keypad including a plurality of keys for selectivity emitting a tone corresponding to each one of said plurality of keys;

a start unit responsive to said keypad for emitting a start signal when one of said keys of said keypad is depressed;

an encoder for converting said tone to a digital stream of bits;

a register including a programmable table of numbers for converting said digital stream of bits to a switching sequence stream of bits;

a decoder for converting said switching sequence stream of bits to a series of signals;

said switch box including switching means for switching said switch position of said switch box in response to said switching stream of bits for connecting said entrance vestibule panel with one of said plurality of apartment stations;

a line control unit for detecting said switch position of said switch box and sending a first line signal when said entrance vestibule panel is connected to said one of said plurality of apartment stations, and sending a second line signal when said entrance vestibule panel is unconnected to said one of said plurality of apartment stations;

a display control for changing said display in response to said line signal of said line control unit;

a timer for emitting a reset signal after a predetermined time after initiation of said timer, wherein said timer is initiated by a start signal from said start unit;

an alarm control unit for detecting a short circuit in said electric circuit of said intercom system and emitting a reset signal when a short circuit is detected by said alarm control unit;

a set up control unit for resetting said register, said switch box, said timer, and said display control in response to said reset signal; and an amplifier for connecting said electronic sound conversion means of said entrance vestibule panel to said one of said plurality of apartment station responsive to said line signal from said line control unit.

13. The intercom system according to claim 12, wherein the electronic sound conversion means is a two way speaker.

14. The intercom system according to claim 12, wherein the electronic sound conversion means is a telephone handset.

15. An intercom system comprising:

an electrical circuit including an entrance vestibule panel, a switch box, a plurality of apartment stations, and an alarm control circuit;

said entrance vestibule panel including an electronic sound conversion means and a plurality of buttons, wherein at least one of said plurality of buttons has a one-to-one correspondence with one of said plurality of apartment stations;

said switch box including switching means for switching said switch position of said switch box responsive to depression of at least one of said plurality of buttons for connecting said entrance vestibule panel with one of said plurality of apartment stations;

a line control unit for detecting said switch position of said switch box and sending a first line signal when said entrance vestibule panel is connected to said one of said plurality of apartment stations, and sending a second line signal when said entrance vestibule panel is unconnected to said one of said plurality of apartment stations; and an alarm control unit for detecting a short circuit in said electric circuit of a intercom system and for resetting said switch box in response to said reset signal.

* * * * *